United States Patent [19]
Klockenga

[11] 4,131,445
[45] Dec. 26, 1978

[54] METHOD OF SELECTIVELY HEATING AN EDGE OF A GLASS SHEET DURING A WELDING PROGRAM

[75] Inventor: Michael E. Klockenga, Peoria, Ill.

[73] Assignee: PPG Industries, Inc., Pittsburgh, Pa.

[21] Appl. No.: 836,258

[22] Filed: Sep. 23, 1977

[51] Int. Cl.² ............................................. C03C 27/00
[52] U.S. Cl. ........................................... 65/40; 65/43; 65/58; 65/DIG. 4
[58] Field of Search .................... 65/58, 43, 40, 243, 65/244, DIG. 4, 152

[56] References Cited
U.S. PATENT DOCUMENTS

| 2,857,501 | 10/1958 | Nitsche | 65/40 |
| 3,726,658 | 4/1973 | Banks | 65/40 |
| 3,847,584 | 11/1974 | Houser et al. | 65/152 X |

FOREIGN PATENT DOCUMENTS
566481  9/1957  Italy ............................................. 65/40

Primary Examiner—Arthur D. Kellogg
Attorney, Agent, or Firm—Donald Carl Lepiane

[57] ABSTRACT

Marginal edge portions of a pair of glass sheets are welded together to make a multiple glazed unit by sequentially imposing a voltage on marginal edge portions of a sheet during side heating cycles followed by alternately imposing a voltage on opposed corners of the sheet during diagonal heating cycles. During the last side heating cycle, the voltage applied to the next to last marginal edge heated is for a shorter time period than the time period in which the first marginal edge was heated. In this manner, the average resistance of the electrical paths during the first diagonal heating cycle is substantially equal.

10 Claims, 8 Drawing Figures

METHOD OF SELECTIVELY HEATING AN EDGE OF A GLASS SHEET DURING A WELDING PROGRAM

BACKGROUND OF THE INVENTION

Field of the Invention

This invention relates to a method of an apparatus for welding glass sheets together to make a multiple glazed unit.

Discussion of the Prior Art and Technical Problems

In the manufacture of double glazed window units, it is well known that such units may be made by uniting the margins of an assembly of glass sheets with a continuous peripheral weld, the central regions of the sheets which are bound by the continuous weld being pulled apart while the welding periphery is soft to establish a desired spacing between the sheets. In the process of manufacturing such all-glass multiple glazed units, two glass sheets are first carefully washed, dried, preheated and assembled at a welding station one above the other. An electrically conductive stripe is deposited on one of the sheets, generally on the upper surface of the upper glass sheet, to form a continuous peripheral electrical path. A plurality of electrodes, preferably placed at the corners of a rectangular window unit, are provided to direct the flow of electrical heating currents through selected portions of the stripe causing it to be heated. The portions of the upper sheet underlying the stripe are heated by the current flowing through the stripe until the glass obtains a temperature at which the stripe burns off. At this stage, the heated margins will have attained a temperature at which the glass is electrically conductive so that heating current from the electrodes now flows through the heated margins.

The corresponding margins of the lower sheet are heated by their close association with the upper sheet; and as the heating continues, the margins of the upper sheet soften and sag into contacting relationship with the margins of the lower sheet. Heating is continued until the margins of both sheets are softened and run together to form a continuous peripheral weld uniting the assembled sheets. Thereafter the sheets are pulled while the air is moved between the sheets in a known manner to bloom the edges of the unit.

Various modes of controlling the heating current supplied to the edges of the glass sheet have been utilized in the prior art. For example, in U.S. Pat. No. 2,398,360 the applied current is either supplied to all four edges simultaneously or in a step-by-step fashion to one side after another by switching the current from one pair of electrodes to another pair. In U.S. Pat. Nos. 3,510,285 and 3,796,556, a switching current is permitted to flow alternately first through one pair of opposed edges of the glass sheets and then through the other pair of opposed edges.

In U.S. Pat. No. 3,628,935, the relay operation of U.S. Pat. No. 3,510,285 is eliminated and a saturable reactor circuit applies a polyphase voltage first to one pair of opposite edges and then the remaining pair of opposite edges. U.S. Pat. No. 3,726,658 provides an electrode arrangement whereby the current flows between diagonally opposed pairs of electrodes, the diagonals being shifted periodically to change the flow pattern, while heating all four edges of the glass sheet simultaneously.

U.S. Pat. No. 3,847,584 teaches that welding current is applied to each of the side edges in turn of a one of the glass sheets in a first heating cycle. The current applied to each edge is automatically controlled through a series of four or more potentiometers which are selected in a timed sequence to produce a desired pattern of current flow and thus a predetermined heating pattern in the selected edge whereby the edges are gradually and uniformly brought up to a desired temperature.

The prior art teachings in general can be grouped into two categories, namely (1) those which teach the sequential heating of the margins or marginal edge portions of a glass sheet and (2) those which teach applying a voltage to opposed corners of a glass sheet. Although each of these techniques are satisfactory for their intended purposes, there are limitations. For example, in the practice of sequentially heating the marginal edges, the procedure is slow because current is individually applied to each margin edge until the glass attains the fusing temperature. Further, the last heated edge is hotter than the first heated edge. The temperature difference between the first heated edge and the last heated edge depends on welding time and/or glass size. As the welding time for each edge increases and/or the length of the edge increases, the temperature difference increases. Further, as the temperature difference increases, the thickness of the weld varies. This is because the hotter glass edge is more viscous and easily shaped whereas the cooler glass edge is less viscous and more difficult to shape. Nonuniformity of edge thickness decreases edge quality.

The limitation in practicing the diagonal welding technique is that the conductive stripe does not conduct current uniformly because the stripe is not applied uniformly. More particularly, the thickness and/or width of the conductive stripe sometimes varies, and the electrical conductivity of the stripe varies. The variation of electrical conductivity results in higher heating currents passing through one pair of adjacent edges than through the other pair of adjacent edges. After the stripe is burned off, the pair of adjacent glass edges are at different temperatures and have different electrical resistivity. The resultant weld is nonuniform for similar reasons discussed above.

U.S. Pat. Application Ser. No. 836,185 filed even date in the name of W. G. Jeffries for "Method Of And Apparatus For Welding Edges of Glass Sheets" overcomes the problems of the prior art. In general, marginal edge portions of a pair of glass sheets are welded together to make a multiple glazed unit by sequentially imposing a voltage on marginal edge portions of a sheet followed by alternately imposing a voltage on opposed corners of the sheet.

Although the welding technique as taught in the above-mentioned application is acceptable, there is a limitation. For example, when going from side heating to diagonal heating, the temperature of the marginal edges is different for reasons discussed above; and, therefore, the electrical resistance of the glass is different. This results in the two current paths, during diagonal heating, having different electrical resistance; and, therefore, the marginal edges of the glass sheets are heated to different temperatures.

It would be advantageous, therefore, to provide a method of and apparatus for providing electrical paths of substantially equal resistance when changing from side heating to diagonal heating during welding of glass sheets to make a multiple glazed unit.

SUMMARY OF THE INVENTION

This invention relates to an improved method of heating marginal edge portions of a glass sheet to a fusing temperature. The method which is improved includes the step of sequentially applying an electrical potential to marginal edge portions of the sheet followed by alternately imposing an electrical potential to opposed corners of the sheet. The improvement includes the step of heating a selected one of the marginal edge portions of the sheet to a predetermined temperature lower than the temperature at which previously heated marginal edge portions were heated immediately prior to practicing the alternately applying step.

This invention also relates to an improved method of manufacturing a multiple glazed unit. The method which is improved includes mounting a first glass sheet over a second glass sheet and sequentially imposing a voltage on marginal edge portions of a one of the sheets for a predetermined number of side heating cycles. Thereafter, a voltage is alternately imposed on opposed corners of the one of the sheets for a predetermined number of diagonal heating cycles to fuse the marginal edge portions of the sheets together to form a multiple glazed unit. The improvement includes the step of heating a selected one of the marginal edge portions of a sheet to a predetermined temperature lower than the temperature at which a previously heated marginal edge portion of the sheet was heated during the last side heating cycle.

This invention further relates to an improved apparatus for heating marginal edge portions of a glass sheet to a fusing temperature. The apparatus which is improved has facilities, e.g. contactors, and an electrical source for sequentially passing an electrical current through marginal edge portions of the sheet for a predetermined number of side heating cycles and thereafter alternately passing current through opposed corners of the sheet for a predetermined number of diagonal heating cycles. The improvement includes facilities, e.g. potentiometers, for heating a selected one of the edge portions to a temperature lower than the temperature at which a selected one of the marginal edge portions of the sheet was heated during the last side heating cycle.

This invention also relates to an improved glass welding apparatus for forming multiple glazed window units. The apparatus which is improved by the instant invention includes an electrical source and four spaced electrodes adjacent to the glass to be welded. A source of alternating current power and facilities, e.g. contactors and relays, for electrically and sequentially connecting adjacent electrodes to the source during side heating cycles and facilities, e.g. contactors and relays, for alternating and electrically connecting opposed electrodes to the source during diagonal welding cycles is provided. The improvement includes facilities, e.g. relays and potentiometers, for heating a selected one of the marginal edge portions to a temperature lower than the temperature at which the other ones of the marginal edges were heated during the last side heating cycle.

DESCRIPTION OF THE INVENTION

This invention relates to welding edges of a pair of glass sheets to form a glass edge multiple glazed unit. The instant invention may be practiced by modifying prior art electrical circuits, e.g. as taught in U.S. Pat. No. 3,847,584 which teachings are hereby incorporated by reference, and is described using the welding circuit taught in U.S. Pat. Application Ser. No. 836,185 filed even date in the name of W. G. Jeffries for "Method Of And Apparatus For Welding Edges Of Glass Sheets" which teachings are hereby incorporated by reference.

Figure 1:
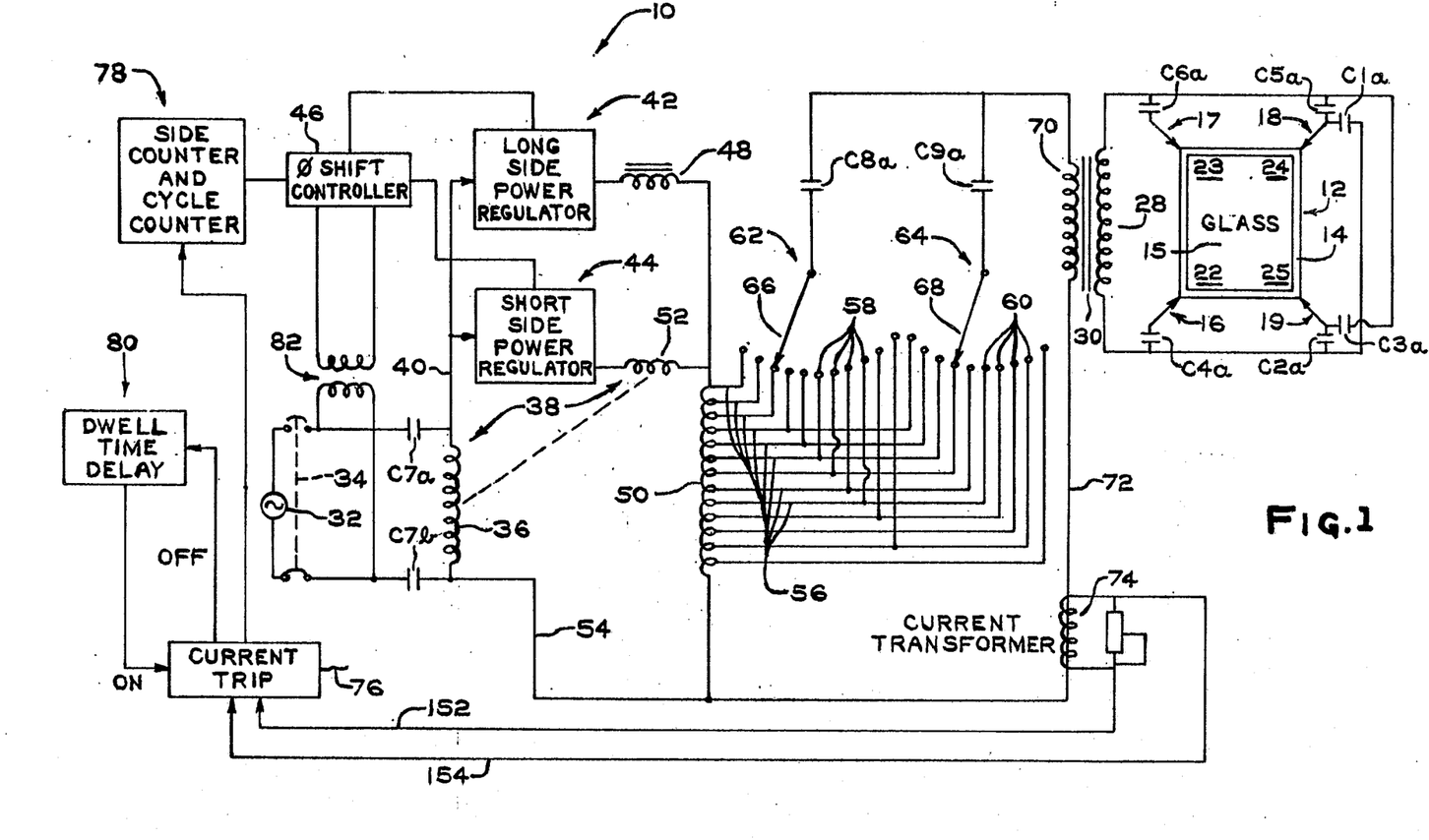
FIG. 1 is a diagrammatic illustration of the overall system of the present invention.

Referring to FIG. 1, there is illustrated in diagrammatic form a welding system 10 taught in the above-mentioned U.S. Pat. Application filed even date in the name of W.G. Jeffries. As will be appreciated, the invention is not limited thereto and is presented to illustrate the environment in which the instant invention may be practiced.

As shown in FIG. 1, an upper glass sheet 12 is aligned over a smaller glass sheet (not shown) in a closely spaced relation thereto. Prior to heating the edges of the sheet 12 for the welding process, both sheets are raised to an elevated temperature in the vicinity of the strain point of the glass sheets. An electroconductive stripe 14 is coated on the upper surface 15 of the sheet 12 immediately adjacent the edge thereof and arranged to be proximate to four corner electrodes, 16, 17, 18 and 19, when the glass is in position for the welding operation. The conductive stripe 14 which is readily dissipated when the temperature of the glass sheets reach the point where the glass becomes electroconductive, provides an initially highly conductive path around the marginal edge portions of the glass sheet 12. The four electrodes 16, 17, 18 and 19 are disposed sufficiently near the corners 22, 23, 24 and 25, respectively, of the glass sheet 12 to produce a spark or arc across the short gap to enable current to flow between the electrodes through the conductive stripe 14. Preferably each electrode 16-19 is pointed diagonally in toward the adjacent corner 22-25, respectively, and spaced therefrom of about ⅛ inch (0.32 centimeter).

Power is applied to the electrodes 16-19 from secondary 28 of a conventional welding transformer 30 by way of normally open relay contacts C1a, C2a, C3a, C4a, C5a, and C6a. Energization of appropriate corresponding relay coils permits selected pairs of the electrodes 16-19 to be energized to heat the edge portions of the sheet. For example, to heat the marginal edge portions 22-23 of the sheet 12, the contacts C4a and C6a are closed; to heat the marginal edge portions 23-24, the contacts C6a and C1a are closed; to heat the marginal edge portions 24-25, the contacts C1a and C3a are closed; and to heat the marginal edge portions 25-22, the contacts C4a and C3a are closed. In the present invention, the successive heating of marginal edge portions, 22-23, 23-24, 24-25 and 25-22 constitute a side heating or welding cycle with the marginal edge portions 22-23 and 24-25 being the long sides of the sheet 12 and marginal edge portions 23-24 and 25-22 being the short sides or ends of the sheet 12.

After predetermined number of side heating cycles, the power is applied to selected electrodes to pass current through both short and both long sides of the sheet 12. For example, the marginal edge portions 25-22-23 and 23-24-25 are simultaneously heated by closing contacts C6a and C2a and the marginal edge portions 22-23-24 and 24-25-22 are heated by closing contacts C4a and C5a. In the present invention, the simultaneously heating of marginal edge portions 25-22-23 and 23-24-25 constitutes a first half of a diagonal heating or welding cycle and simultaneously heating marginal edge portions 22-23-24 and 24-25-22 constitutes the second half of the diagonal heating or welding cycle. As will be appreciated, the first half may be the second half and the second half may be the first half of a diagonal heating cycle.

In the practice of the invention, it is recommended that the electrode 17 between the first and second marginal edge portions heated and the electrode 19 between the third and fourth marginal edge portions heated be energized for more efficient heating of the marginal edges during the first half of the first diagonal heating cycle. For example, if the side heating cycle heats 22-23; 23-24; 24-25; and 25-22, the contacts C2a and C6a are closed to heat marginal edge portions 23-24-25 and 25-22-23 during the first half of the first diagonal heating cycle. Using this arrangement, the current passes through the coldest side and the hottest side, e.g., 22-23 and 22-25, respectively, in the above example and through the second and third hottest side, e.g., 24-25 and 23-24, respectively, in the above example. In this manner, the difference of the average resistance between each current path is minimized.

Power is applied to the system 10 from a standard source 32 of 60 cycle alternating current which applies a voltage of approximately 460 volts to a circuit breaker 34, to normally open relay contacts C7a and C7b and across primary windings 36 of Inductrol transformer 38. The upper end of the primary winding 36 is connected by way of line 40 to supply alternating current power to a long side power regulator 42 and a short side power regulator 44 which provide control of alternating current power for the welding electrodes 16-19 during the side heating cycles. The long side power regulator 42 is used alone during the diagonal heating cycles because there are only long sides.

The phase angle of the output of the long side power regulator 42 is controlled by a phase shift controller 46, with the regulator output being applied through a reactor 48 to the upper end of a tapped autotransformer 50. Similarly, the phase angle of the output of the short power regulator 44 is controlled by the phase shift controller 46 and is applied by way of secondary winding 52 of the Inductrol transformer 38 to the upper end of the autotransformer 50. The lower end of the autotransformer 50 is connected to the lower end of the secondary windings 36 of the Inductrol transformer 38 by line 54 to complete the power circuit.

The secondary winding 52 of the Inductrol transformer 38 is connected in series with the output of the short side regulator 44 and acts as a voltage bucking winding to reduce the current applied to the autotransformer 50. The secondary winding 52 insures that the voltage supplied to the welding electrodes 16-19 for the short sides e.g., 23-24 and 22-25 of the glass sheet 12 is reduced by an amount determined by the ratio of the primary and secondary windings 36 and 52, respectively, to prevent improper heating, e.g., underheating, of the short sides during the side heating cycles.

Autotransformer 50 has a plurality of taps 56 which are connected to corresponding contacts 58 and 60 on first and second tapping switches 62 and 64, respectively, having adjustable wiper arms 66 and 68, respectively. Wiper arm 66 is moveable to feed a selected voltage level through a normally open relay contact C8a to the upper end of primary winding 70 of the welding transformer 30. Similarly the wiper arm 68 of the second tapping switch 64 is connected, by way of normally open relay contact C9a, also to the upper end of the primary windings 70 of the welding transformer 30. The lower end of the winding 70 is connected by way of the line 72 to the lower end of the autotransformer 50, to the lower end of the winding 36 by way of the line 54 and through normally open relay contact C7b to the source 32.

The first and second tap switches 62 and 64, respectively, permit different voltages to be applied to the welding electrodes 16-19 on different heating cycles. Thus, for example, the contact C8a is closed to supply the input voltage to the welding transformer 30 during the side heating cycles while the contact C9a is closed during the diagonal heating cycles. The side heating cycles occur when the glass is relatively cool, and thus a higher voltage level is normally selected for use than would be the case for the diagonal heating cycles, when the increased temperature of the glass has reduced its resistance. Typically, a voltage of from 199V. to 460V. may be selected by the tap switch 62 and 64, with the welding transformer 30 stepping this voltage up to the voltages required for proper current flow. Thus, if the wiper arm 66 of the tap switch 62 is set to the far left as viewed in FIG. 1, a voltage of 460V. would be applied to the primary windings 70 of the welding transformer 30 resulting in 22,000 volts appearing across the secondary windings 28. Typically, however, tap switch 62 will be set to produce a voltage of approximately 17,000 volts across the selected electrodes during the side heating cycles, while the tap switch 64 will be set to produce approximately 10,000 volts across the selected electrodes during the diagonal heating cycles. These values are for the long side of the glass sheet during the side heating cycles. The secondary winding 52 of the Inductrol transformer 38 will reduce these values by an amount proportional to the reduced length of the short side of the glass during the side heating cycles.

The phase shift controller 46 controls the power regulators 42 and 44 during the side heating cycles and controls the power regulator 42 during the diagonal heating cycles so as to produce effective currents in the glass being welded which will raise the glass temperature in accordance with a predetermined selected heating curve. The heating curve is produced by a plurality of phase angle controllers such as potentiometers which are sequentially selected in accordance with predetermined patterns whereby the power is supplied by the regulators 42 and 44 in accordance with not only the cycle in which the system is operating but the marginal edge or step to which the voltage is being applied within a given cycle. The selection of the proper control sequence is accomplished by way of timers to be described and by way of suitable counters which may be of the conventional relay type which detect and keep track of the cycle and step in which the system 10 is operating.

Although not limiting to the invention, a current transformer 74 of the type taught in U.S. Pat. No. 3,847,584 senses the current flow through the line 72 and is responsive to the current flowing through the glass sheet 12 during the side heating cycles and the diagonal heating cycles. The current flowing through the glass sheet 12 is indicative of the temperature and therefore the output of the current transformer 74 may be used to operate a current tripping network 76 of the type taught in U.S. Pat. No. 3,847,584 to determine when a selected maximum current is flowing through the glass for any given cycle. In general, when the detected current exceeds the value set for the cycle, the circuit in side counter and cycle counter 78 operates to shift the counter circuit to the next step for the side heating cycle and to opposite diagonal corners for the diagonal heating cycle. A dwell time delay network 80 is responsive to the operation of the current trip network 76 to prevent the next adjacent side from being heated during the side heating cycle and opposite diagonal corners during the diagonal heating cycle until all of the appropriate relays have been set up.

In the following discussion, the first two heating cycles are side heating cycles followed by 5 diagonal heating cycles. As will be appreciated, the invention is not limited thereto and any number of side heating and diagonal heating cycles may be used in the practice of the invention.

Figures 2, 3:
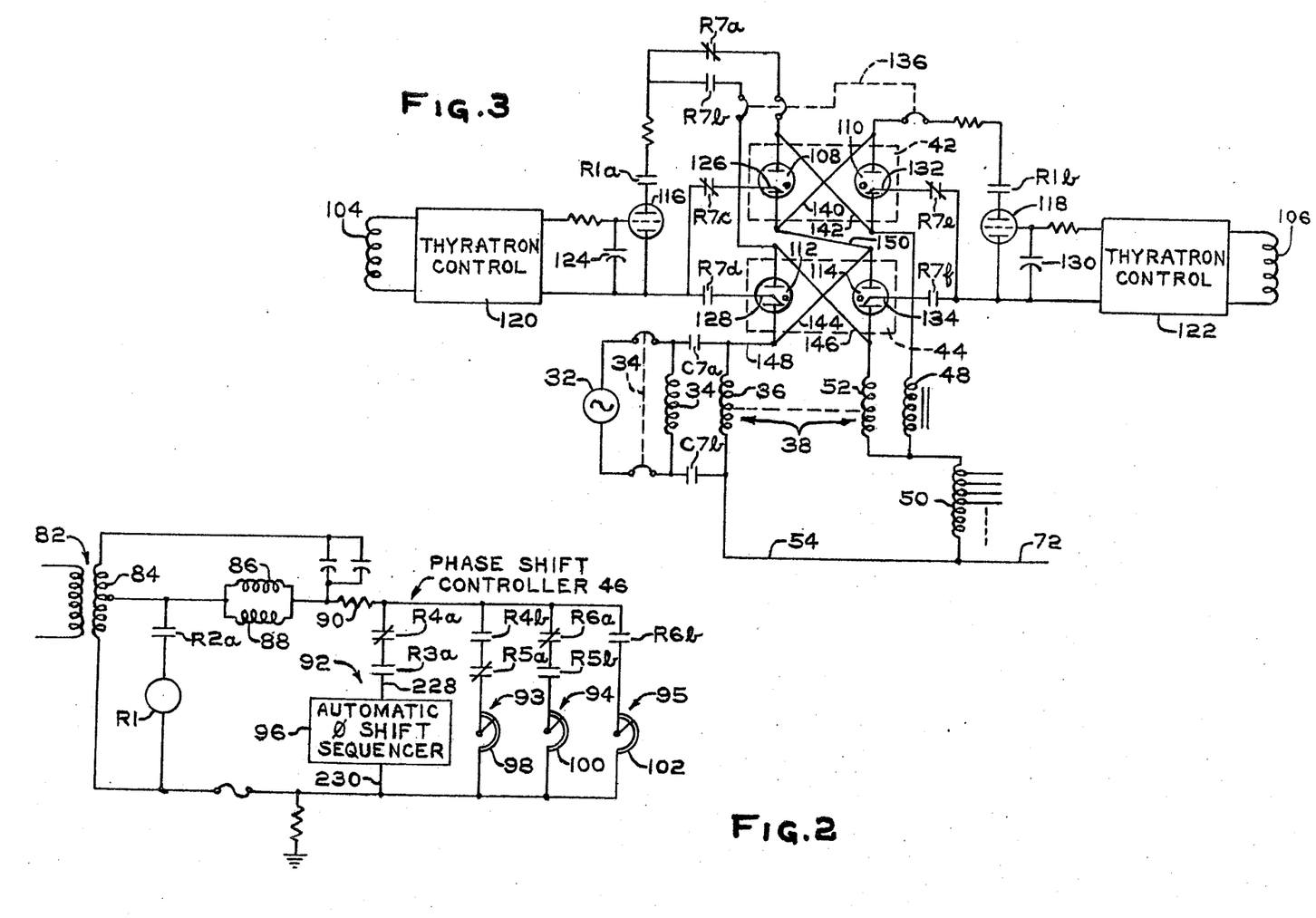
FIG. 2 is a diagrammatic and partially schematic illustration of the phase shift controller shown in FIG. 1.
FIG. 3 is a partial schematic diagram of the power regulators of FIG. 1.

The phase shift controller 46 shown in greater detail in FIG. 2 is similar to the phase shift controller taught in U.S. Pat. No. 3,847,584. Power is applied to the controller 46 by way of the transformer 82 connected to the power source 32 as shown in FIG. 1. This power is applied across a relay R1, the energization of which is controlled by a normally open relay contact R2a which is closed at the start of a welding operation, thereby energizing the relay R1 to permit operation of the power regulators 42 and 44 for the side heating cycles and operation of the power regulator 42 for the diagonal heating cycles. Power from secondary winding 84 of the transformer 82 is also applied through parallel windings 86 and 88 which constitute the primary windings of output transformers for the phase shift controller 46 and through a resistor 90 to a plurality of selectably energizerable phase angle controls generally indicated at 92, 93, 94 and 95. Each of the controls 92-95 is connected across the transformer 82 by way of suitable relay contacts to be discussed below whereby a selected one of the controls 92-95 may be connected to the output windings 86 and 88.

In particular, the phase angle controls 92-95 are connected in the circuit with the selected relay contacts of the cycle counter 78 whereby a selected control function is obtained for each heating cycle. Thus, automatic phase shift sequencer 96 is utilized during the side heating cycles, e.g., cycles 1 and 2 of the glass heating operation and placed in the control circuit by way of normally open contact R3a of the relay R3 and a normally closed relay contact R4a of relay R4. These relays are in the network of the cycle counter 78 with relay R3 being energized at the start of cycle 1 of the heating cycle to close the relay contact R3a and place the automatic phase sequencer 96 in series with the output windings 86 and 88. This allows the automatic phase sequencer 96 to provide the output from the phase shift controller 46 during the first and second side heating cycle whereby the automatic phase shift sequencer 96 controls the regulators 42 and 44 (see FIG. 1). As previously mentioned during the side heating cycle, sides 22-23, 23-24, 24-25, and 25-22, are sequentially heated. At the start of the first diagonal heating cycle, contact R4a is shifted to its open position and the automatic phase shift sequencer 96 is removed from the circuit. At the same time, the relay R4 closes it normally open contact R4b to operate on the long side power regulator 42 by placing potentiometer 98 of the phase angle control 93 in series with output windings 86 and 88. The setting of the potentiometer 98 of the phase angle control 93 controls the long side power regulator 42 to regulate the current flow through the diagonal corners during the first diagonal heating cycle to simultaneously heat marginal edges 25-22-23 and 23-24-25 during the first half of the first diagonal heating cycle and to simultaneously heat marginal edge 22-23-24 and 24-25-22 during the second half of the first diagonal heating cycle.

At the start of the second diagonal welding cycle relay R5 is energized opening the relay contacts R5a and closing normal open relay contact R5b placing the potentiometer 100 of the phase angle control 94 in series with the output windings 86 and 88. The setting of the potentiometer 100 controls the long side power regulator 42 to regulate the heating of the glass sheet for the second and third diagonal welding cycles in a similar manner discussed for the first diagonal heating cycle. At the end of the third diagonal welding cycle, relay R6 is energized to shift to open normally closed relay contacts R6a to remove phase angle control 94 from the circuit and closing normally open relay contact R6b to place the phase angle control circuit 95 in the system. For the remaining diagonal welding cycles of the heating operation, potentiometer 102 of the phase angle control circuit 95 controls the long side power regulator 42 and thus controls current flow through marginal edges of the glass sheet in a similar manner discussed for the first diagonal heating cycle. It has been found that the potentiometers 98, 100 and 102 may after initial adjustment be left at fixed setting to provide optimum heating and welding of the glass sheets.

The manner in which (1) the automatic phase shift sequence 96 regulates the power supplied by regulators 42 and 44 to the welding transformer 30 during the side heating cycles and (2) the potentiometers 98, 100 and 102 regulate the power supplied by the regulator 42 during the diagonal welding cycles to the welding transformer may be seen more clearly in FIG. 3 which is a partial schematic diagram of a preferred form of the regulators 42 and 44.

With specific reference to FIG. 3, the output windings 86 and 88 of the phase shift controller 46 (FIG. 2) is comprised of primary windings of output transformers having secondary windings 104 and 106, respectively, which provide the input to the power regulators 42 and 44 during the side welding cycles and to the long side power regulator 42 during the diagonal heating cycles. One winding provides the input for the positive going portion of the alternating current waveform and the other winding provides the input for the negative going portion of the waveform whereby a full wave output is obtained from the regulators during selected welding cycles. The power regulating elements in the long side regulator 42 which are used during the side welding cycles to heat the long side of the glass sheet 12 and during the diagonal welding cycle are, in the present embodiment, a pair of ignitrons or gas breakdown tubes 108 and 110. The ignitrons are cross-connected in a parallel opposing circuit to be alternately conductive and produce a full wave of controlled output. In a similar manner, the short side power regulator 44 which is used during the side heating cycle to heat the ends of the glass sheet 12 includes a pair of ignitrons 112 and 114 similarly cross-connected for alternate conduction. The selection of the long side and short side ignitron is by way of relay contacts R7a through R7f responsive to a normally de-energized relay R7 which is operated to shift all of its contacts when the short side is to be welded during the side welding cycles and is removed by relay contact R26i (FIG. 6A) during the diagonal welding cycles.

Conduction of the ignitrons is controlled by a pair of thyratron gas tubes 116 and 118 which are, in turn, controlled by the current level in the secondary windings 104 and 106, respectively, by way of corresponding thyratron control networks 120 and 122. The thyratron control networks 120 and 122 include suitable rectifiers to prevent damage to the igniter electrodes of the ignitrons and prevent damaging reverse currents during the half cycles in which the corresponding ignitrons are off. The thyratron control network 120 provides a control voltage, the magnitude of which is determined by the input on the transformer secondary winding 104, to charge a timing capacitor 124 which controls the time at which the thyratron fires, and thus controls the phase angle of firing. When the thyratron 116 becomes conductive, it applies a firing voltage to either the igniter electrode 126 of the ignitron 108 or the igniter electrode 128 of the ignitron 112, depending upon the energization of relay R7 thereby firing a corresponding ignitron.

In a similar manner, the current from transformer secondary 106 is applied through thyratron control network 122 to a timing capacitor 130, the time constant of which regulates the firing of thyratron 118. When the thyratron 118 fires, it applies a firing voltage to the igniter electrode 132 of igniter 110 or to the igniter electrode 134 of the ignitron 114, again depending upon the energization of the relay R7. Thus the magnitude of the current applied to the transformer windings 104 and 106 determines the time in each alternating current cycle at which the thyratrons 116 and 118 will fire and accordingly, determines the phase angle at which the corresponding ignitrons supply power to the autotransformer 50.

It will be seen that to operate the ignitron circuit of FIG. 3, it is first necessary to energize relay R1 (FIG. 2) which closes the normally open contacts R1a and R1b in series with the thyratrons 116 and 118, respectively. The thyratron 116 is connected through relay contact R1a, normally closed contact R7a and a circuit breaker 136 to the anode of the ignitron 108. The cathode of the thyratron 116 is connected to the igniter electrode 126 by way of normally closed contact R7c and to the igniter electrode 128 through normally open contact R7d. The anode of the thyratron 118 is connected through relay contact R1b and circuit breaker 136 to the anode of the ignition 110 while the cathode of the thyratron is connected by way of normally closed contact R7e to the igniter electrode 132 and through normally open contact R7b to the igniter electrode 134. The anodes and cathodes of ignitrons 108 and 110 are cross-connected by way of lines 140 and 142 while the anodes of ignitrons 112 and 114 are cross-connected by lines 144 and 146.

One side of the alternating current source 32 is connected through the circuit breaker 34, normally open main contact C7a and a line 148 to the cathode of ignitron 112. This side of the source 32 is further connected through the line 144 and connecting line 150 to the cathode of ignitron 108. The other side of source 32 is connected through the circuit breaker 34 and normally open main contact C7b to the line 54 through which alternating current power is applied by way of the transformer 50 and secondary winding 52 to the cathode of the ignitron 114 and by way of transformer 50 and reactor 48 to the cathode of the ignitron 110.

The effective change in the firing angle of an ignitron is fully discussed in U.S. Pat. No. 3,847,584 at column 9, line 38, to column 10, line 6, and reference thereto may be made.

As indicated in the discussion of FIG. 1, the current trip network 76 senses the current flow to the welding transformer 30 and when a predetermined level of current flow is reached for each step of the side welding cycle and diagonal welding cycle produces a stepping signal which shifts the welding operation to the next adjacent side of the glass for the side welding cycle and to the opposite set of diagonal corners for the diagonal welding cycle. In order to establish a desired current maximum for each cycle, a plurality of reference voltages are set up by the current trip network 76 and selected by relays of the cycle counter 78 to keep track of the cycles of the welding operation.

Figure 4:
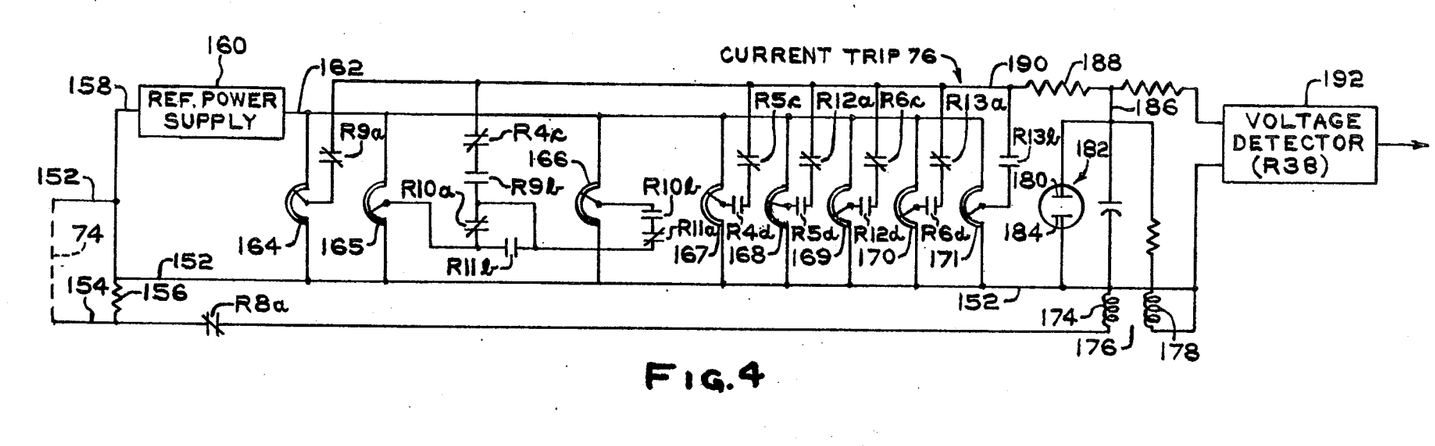
FIG. 4 is a partially schematic and partially diagrammatic illustration of the current trip circuit of FIG. 1.

With reference to FIG. 4, the output for the current sensing transformer 74 is applied by way of lines 152 and 154 across an input resistor 156 to the current trip network 76. Line 152 is connected by way of line 158 to a suitable rectifier and filter network 160 to provide a reference voltage on line 162. A plurality of potentiometers 164-171 used in the preferred embodiment of the present welding system are connected in parallel between lines 162 and 152. The potentiometer 164 is used during the first side welding; the potentiometers 165 and 166 are used during the second or last side welding cycle. As can be appreciated, the invention is not limited to the number of side welding cycles; therefore, should more than two side welding cycles be employed, potentiometers for each additional side welding cycle similar to the potentiometer 164 would be used. The potentiometer 167 is used during the first diagonal welding cycle and the potentiometers 168-171 are employed during the remaining four diagonal welding cycles. Further as can be appreciated, the invention is not limited to the number of diagonal welding cycles and although the current trip network 76 shown in FIG. 4 is arranged for five diagonal welding cycles, the invention is not limited thereto and may be used with more or less than five diagonal welding cycles.

The line 154 is connected through a normally closed contact R8a to primary winding 174 of a transformer 176, the opposite side of which is connected to the line 152. Secondary winding 178 of the transformer 176 is connected between the line 152 and anode 180 of a gas diode 182. Cathode 184 of the gas diode 182 is connected to the line 152. The anode 180 of the gas diode 182 is connected by way of line 186 to a resistor 188 to a common output line 190 from the adjustable arms of the potentiometers 164-171.

The adjustable arm of each potentiometer 164-171 is connected through to suitable contacts of relays R4, R5, R6, R9, R10, R11, R12 and R13 in the cycle counter 78 (FIG. 1). During the first side welding cycle relay contact R9a is closed and contacts R9b, R10b, R11b, R5d, R12d, R6d, R13b, and R4d and are open to remove potentiometers 165-171 from the circuit. During the second side heating cycle; i.e., the last side welding cycle, contact relay R9 is energized to open relay contact R9a and close contact R9b to remove the potentiometer 164 from the circuit and connect the potentiometer 165 to the circuit through normally closed relay contacts R4c and R10a. Potentiometer 165 is in the circuit for heating of sides 22-23, and 23-24 during the first two steps of the second side welding cycle. For the heating of the third side; i.e., size 24-25 during the last or second side welding cycle, relay contact R10a is open and normally open relay contact R10b is closed. Potentiometer 166 is now in the circuit by way of closed relay contact R10b, normally closed contact R11a closed contact R9b, and normally closed contact R4c. Potentiometer 165 is removed from the circuit by open relay contact R10a and R11b. After the side 24-25 is heated, the relay R11 is energized to open relay contact R11a and close normally open contact R11b. The potentiometer 166 is removed from the circuit and the potentiometer 165 is back in the circuit by way of closed contacts R4c, R9b and R11b for heating side 25-22 of the sheet 12.

During the last side welding cycle, the heating of each marginal edge is performed to optimize the subsequent diagonal heating cycle. During the last side welding cycle, sides 22-23, 23-24, 24-25 and 25-22 are successively heated. As side 23-24 is heated, side 22-23 cools and as side 24-25 is heated, sides 22-23 and 23-24 cool, etc. If the subsequent heating cycle involved individual marginal edges, the above procedure would be acceptable; however, when going from a side welding cycle to a diagonal welding cycle, the average resistance of the two current paths for diagonal welding should be approximately equal for optimum heating. Therefore, it is preferred that the long side 24-25 be heated for a shorter time than long side 22-23 so that its temperature and, therefore, resistance nearly approximates the temperature of the side 22-23 previously heated. In other words, the resistance of sides 25-22-23 is approximately equal to the resistance in sides 23-24-25.

After the second side welding cycle is completed, the relay R4 is energized to open relay contact R4c and close normally open relay contact R4d to put the potentiometer 167 in the circuit by way of normally closed relay contact R5c. After the first diagonal welding cycle is completed, the relay R5 is energized to open relay contact R5c and close normally open relay contact R5d. The potentiometer 168 is now in the circuit by way of normally closed contact R12a and closed relay contact R5d. After the second diagonal welding cycle is completed, normally closed relay R12a is open and normally open relay R12b is closed to remove the potentiometer 168 from the circuit and put the potentiometer 169 in the circuit by way of normally closed relay R6c and closed relay contact R12b. After the third diagonal welding cycle, normally closed relay R6c is open and normally open relay contact R6d is closed. The potentiometer 169 is removed from the circuit and the potentiometer 170 is put in the circuit by way of closed relay contact R6d and normally closed relay R13a. After the fourth welding cycle, the normally closed relay R13a is open and the normally open relay R13b is closed to remove the potentiometer 170 from the circuit and put the potentiometer 171 in the circuit for the fifth diagonal welding cycle.

The potentiometers 164-171 are each adjusted for the desired current level in their corresponding cycles and during the welding operation are sequenced to provide the required control. Whenever the current level detected by the transformer 74 exceeds the level preset by the corresponding cycle potentiometer, a voltage detector network 192 is energized to shift the operation to the next marginal edge of the glass as has been explained. More particularly, to the next marginal edge during the first side welding cycle, between the potentiometers 165 and 166 during the last side welding cycle and to opposite diagonal corners during the diagonal welding cycles.

It was noted with respect to the phase shift controller 46 illustrated in FIG. 2 that although the diagonal welding cycle of the normal welding operation utilized fixed current values (and thus fixed firing angles for the long side power regulator 42) as determined by the settings of the potentiometers 98, 100 and 102, the side welding cycles, i.e., the first two cycles, require different approach since the relatively cool glass has during the initial period of heating a relatively high resistance to current flow. Accordingly, in place of a fixed potentiometer the automatic phase shift sequence 96 is preferred during the first two cycles, i.e., the side welding cycles for regulating the firing angle of the power regulators 42 and 44. It has been known in the past to utilize for cycles 1 and 2 a manually adjustable potentiometer positioned at the glass welding location for adjustment by an operator who observes the progress of the welding during the side welding cycles and adjusts the potentiometer accordingly to produce the desired welding results. As can be appreciated, however, such manual operation presents serious difficulties for not only does it require very skilled operators to obtain optimum results but in addition it is difficult even with the skilled operator to obtain uniform results each time. Variations in the quality of the glass unit produced by a manual system become more pronounced and when one operator replaces another as in the change of shifts where less skilled operator may replace a more skilled operator. It is, therefore, recommended that the automatic phase shift sequencer taught in U.S. Pat. No. 3,847,584 be used in the practice of the invention.

Figure 5:
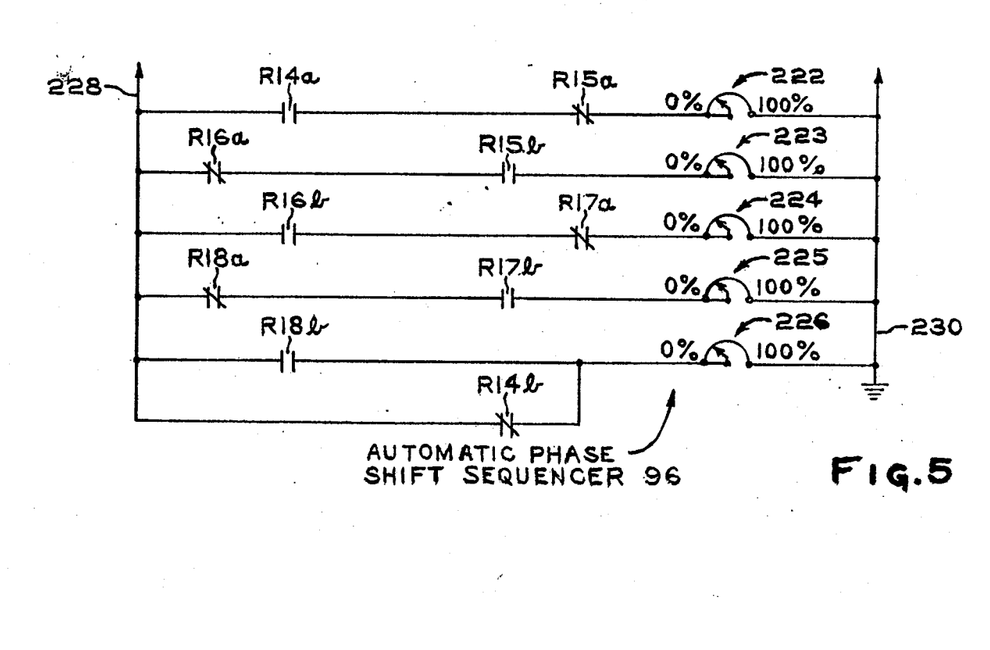
FIG. 5 is a schematic diagram of the automatic phase shift sequencer of FIG. 2.

With reference to FIG. 5, the automatic phase sequencer 96 of the type taught in U.S. Pat. No. 3,847,584 includes a plurality of adjustable potentiometers 222-226 which are connected to suitable sequence relay contacts between line 228 and a common line 230. Potentiometer 222 is connected between the lines 228 and 230 by way of normally open relay contact R14a and normally closed contact R15a, with the movable arm of the potentiometer 222 being adjustable to place a selected resistance in the line. When both relay contact R14a and R15a are closed, the resistance value of the potentiometer 222 is placed in series with the line 228 and when the automatic phase sequencer 96 is selected by the simultaneous closure of relay contacts R2a and R3a (FIG. 2) the resistance value of the potentiometer 222 determines the firing angle of the power regulators 42 and 44 (FIGS. 1 and 3) and thus determines the current level applied to marginal edge portion of the glass being welded. In similar manner, potentiometer 223 is connected across lines 228 and 230 by way of normally closed relay contact R16a, normally open relay contact R15b; potentiometer 224 is connected by way of normally open relay contact R16b and normally closed relay contact R17a; and the potentiometer 225 is connected by way of normally open relay contact R17b and normally closed relay contact R18a. The manually adjustable operator potentiometer 226 overrides or supplements the automatic phase shift sequencer. The potentiometer 226 is connected across the lines 228 and 226 by way of either a normally open relay contact R18b or normally closed relay contact R14b, these contacts being connected in parallel with each other.

It will be seen that when none of the relays R14, R15, R16, R17 and R18 are energized, none of the potentiometers 222-225 will be connected to the line 228 whereas the operator potentiometer 226 will be connected through normally closed relay contact R14b to the line 230.

For a complete discussion of the operation of the automatic phase sequence, reference may be made to column 11, line 15, to column 12, line 21 of U.S. Pat. No. 3,847,584.

It has been found that during the diagonal welding cycles, a side of the glass sheet may be lower in temperature than the remaining sides. When this occurs, the cooler side does not fuse properly. The discussion will now be directed to the instant invention which interrupts the diagonal heating cycle to heat the marginal edge that is lower in temperature than the remaining sides.

Figure 6A:
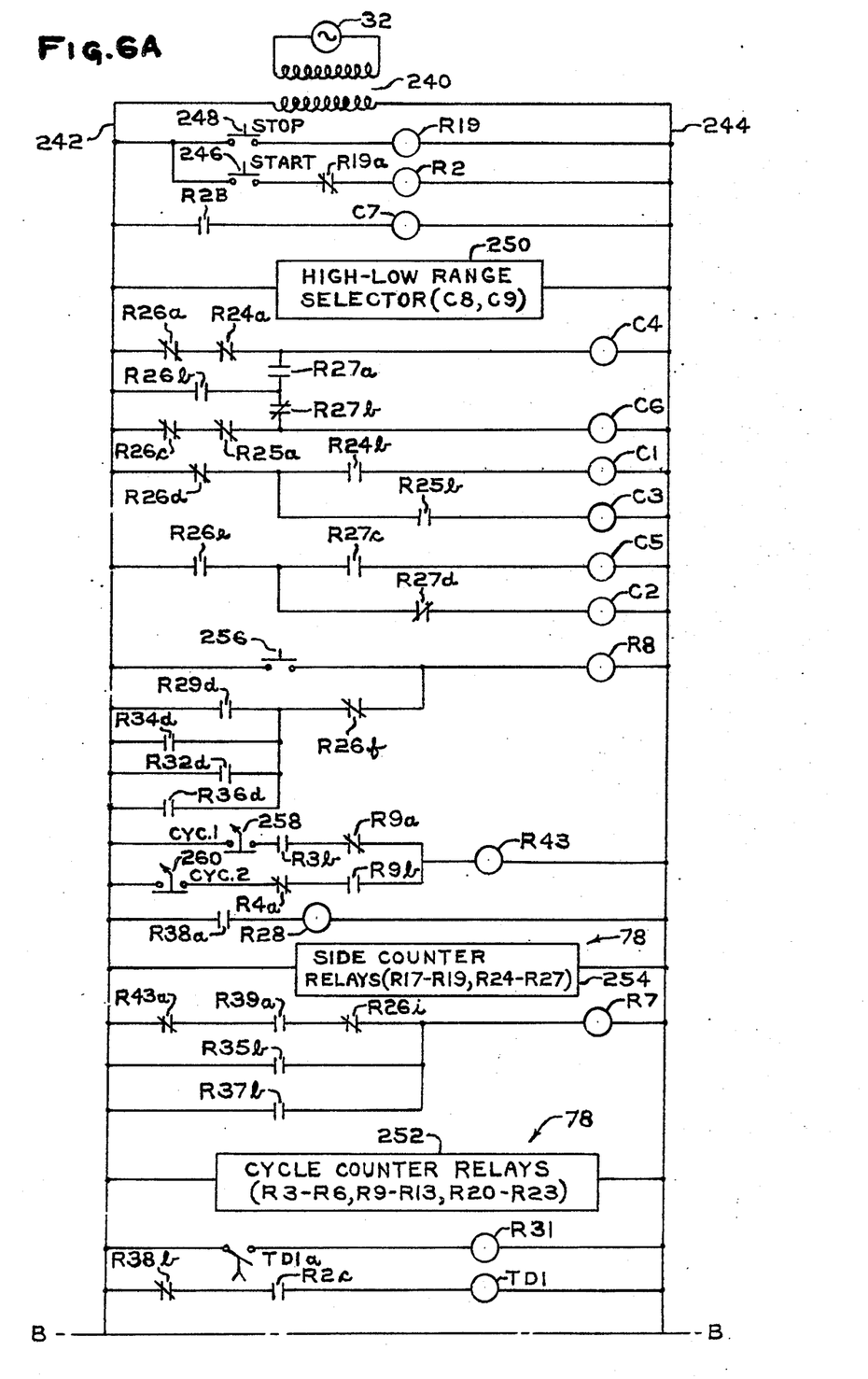
FIGS. 6A, 6B and 6C are partial schematic diagrams of relay network which controls the operation of the system shown in FIG. 1.
Figure 6B:
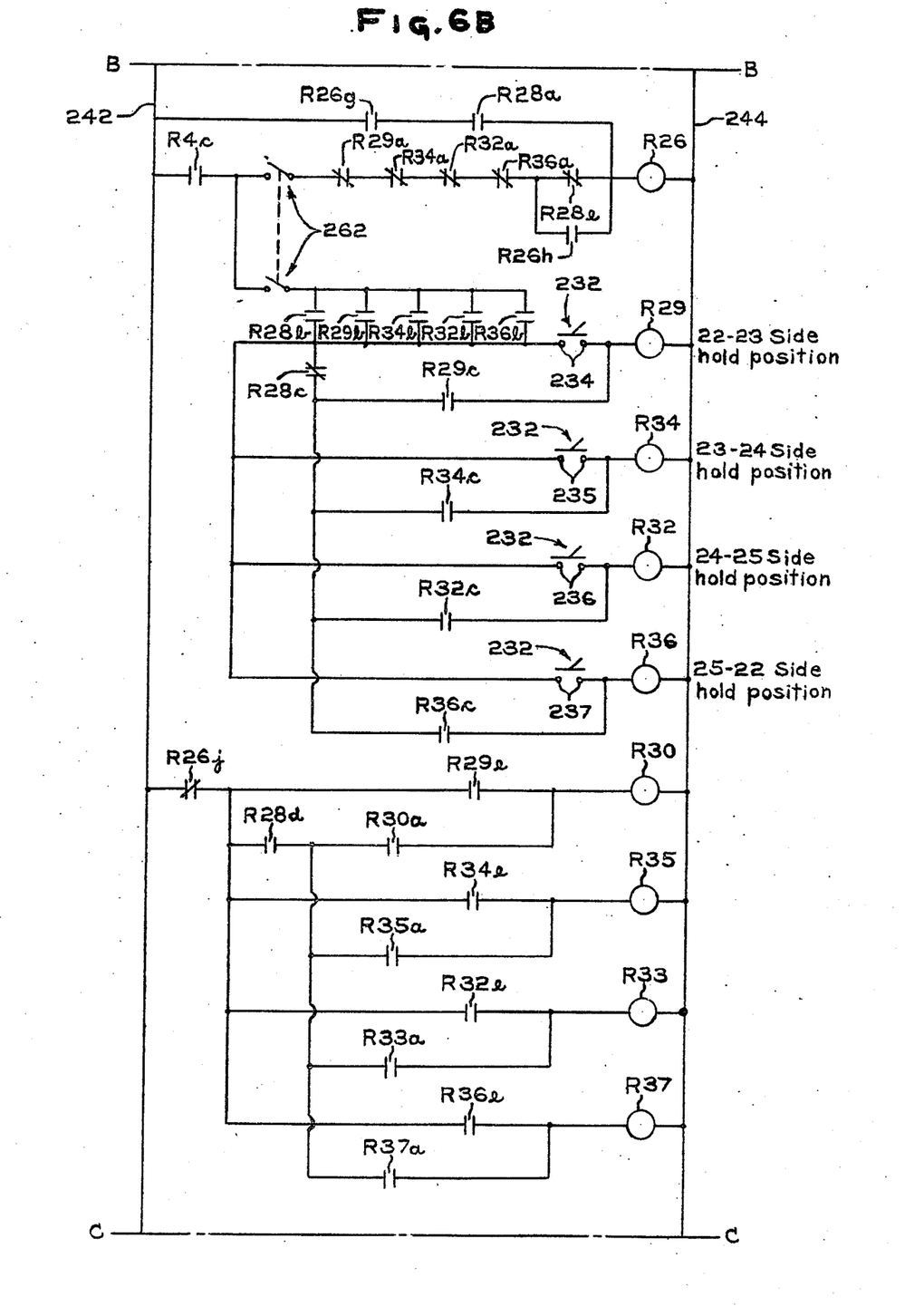

The circuit of the instant invention is shown in FIG. 6B and is used during the diagonal welding cycle to interrupt the diagonal weld after the completion of a half cycle to heat a selected side. This may be accomplished by moving a toggle switch stick 232 to one of four positions each corresponding to a side of the sheet to close its respective contacts 234-237. For example, for heating side 22-23, contacts 234 of the switch 232 are closed; for heating side 23-24, contacts 235 of the switch 232 are closed; for heating side 24-25, contacts 236 of the switch 232 are closed and for heating side 25-22, contacts 237 of the switch 232 are closed. Through a series of relays and relay contacts, the current trip 76 is removed from the circuit and a selected side is heated. When the side is heated to the desired temperature, as indicated by visual inspection of the side, the switch 232 is released to continue the diagonal welding cycle.

Figure 6C:
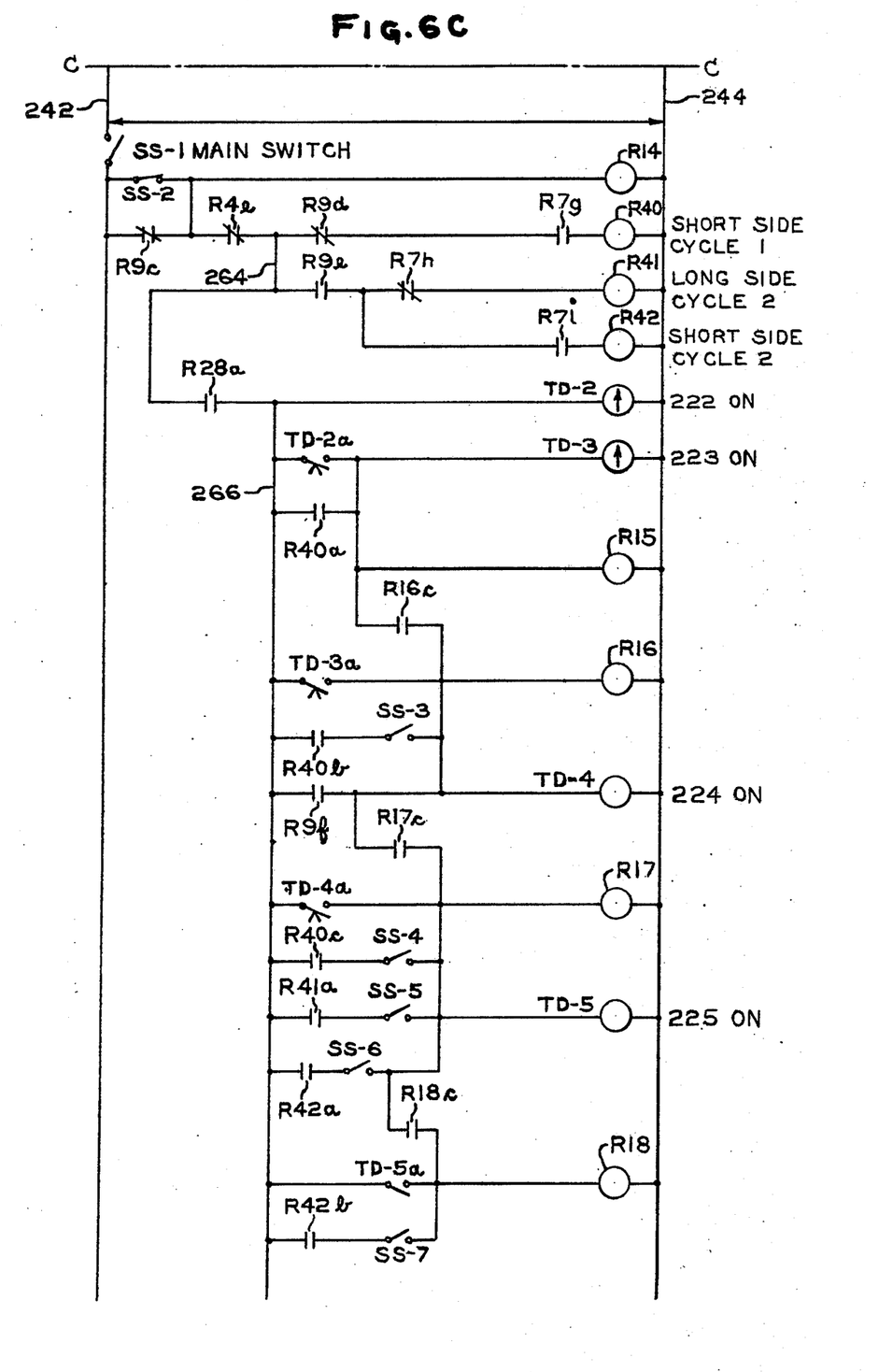

Shown in FIGS. 6A and 6B are the relay control for the overall circuit operation, while FIG. 6C in general includes the sequencing relays for the automatic phase shift sequencer 96. As shown in FIG. 6A, the alternating current is applied from power source 32 through power transformer 240 across lines 244 and 242, between which the control relays are connected. It will be understood that although the relay network illustrated in FIGS. 6A-6C includes the major features of the present system, a number of auxiliary features such as safety relays, temperature controllers for the ignitrons, cooling water thermostats, test relays, indicator lights, and the like have been eliminated in order to simplify the system and make it more readily understandable.

Start and stop switches 246 and 248, respectively, are provided for the welding system to energize relays R2 and R19, respectively, by connecting them across lines 242 and 244. Stop relay R19 includes an interlocked relay contact R19a in series with the relay R2 to insure that relays R2 and R19 cannot be energized at the same time. When the relay R2 is energized to depressing the push button 246 its normally open relay contact R2b is shifted to the closed position to energize the main contactor C7 to close its normally open contacts C7a and C7b (FIG. 1) to applying alternating current to the welding system 10 of FIG. 1. One or the other of the high and low range selector controls C8 and C9 is then energized by the network 250, thereby placing either the first or second tap switches 62 and 64 in series with the welding transformer 30. The energization of the contactors C8 and C9 is determined by the cycle counting section 252 (FIG. 6A) of the side counter and cycle counter 78 (FIG. 1) which incorporates the relays R3-R6, R9-R13, and R20-R23 connected in known manner to keep track of and to control the cycle in which the welding system is operating. The contactor C8 is operated during the first two cycles, i.e., side welding cycles and the contactor C9 during the remainder cycles, i.e., diagonal welding cycles in the embodiment described herein.

The discussion will now be directed to the operation of contactors C1 through C6 during the side welding cycles and diagonal welding cycles. During the welding cycle, welding contacts C1 through C6 are energized by normally closed relay contacts R26a, R24a, R27b, R26c, R25a, R26d and R27d and normally open relay contacts R27a, R24b, R25b, R26b, R26e, and R27c, responsive to relays R26, R24, R27 and R25 in the side counter portion 254 of the side counter and cycle counter 78. At the start of the side weld cycle, contactor C4 is energized by normally closed relay contacts R26a and R24a and contactor C6 is energized by normally closed relay contacts R26c and R25a. Energization of contactors C4 and C6 close contacts C4a and C6a, respectively, to apply voltage to the electrodes 16 and 17 to heat the long side 22-23 of the sheet 12. After the side 22-23 is heated to the desired temperature as indicated by the current transformer 74, the side counter 254 operates to energize the relay R24 to open the relay contact R24a to de-energize the contactor C4 and close normally open relay contact R24b to energize the contactor C1. The contact C1a closes and a voltage is applied to electrodes 17-18 to heat the short side 23-24 of the sheet. After the side 23-24 is heated to the desired temperature, the relay R25 is energized to open the closed relay contact R25a to de-energize the contactor C6 and close normally open relay contact R25b to energize contactor C3 to close normally open contact C3a. Voltage is applied to the long side 24-25 by way of electrodes 18 and 19. After the side 24-25 is heated to the desired temperature, the relay R24 is de-energized to open relay contact R24b to de-energize contactor C1 and to close contact R24a to energize contactor C4 to close contactor C4a to apply a voltage to electrodes 16 and 19 to heat the short side 22-25 of the sheet to complete one side welding cycle. During the first side welding cycle, the conductive stripe is burned off and the temperature of the glass increased to reduce its electrical resistance.

If during the automatic side welding cycle the operator determines that for some reason a weld is not complete, a side hold push button 256 is provided which permits an override of the stepping operation by disabling the current tripping network 76. Thus, by depressing switch 256, the operator energizes relay R8 to open relay contact R8a (FIG. 4) thereby preventing the current trip network from detecting the current level in the welding transformer. When this is the case, the current flow through the marginal edge portion being welded is continued until the operator releases the push button 256 and contact R8a recloses to place the current trip network in the circuit.

The relays in the side counter 254 operate in a similar manner during the side welding cycle. However, on the last side weld cycle, the cycle counter relays operate on the current trip network 76 (FIG. 4) to energize the relay R9 to open normally closed relay contact R9a and close normally open relay contact R9b to put the output of potentiometer 165 into line 190 during the heating of sides 22-23 and 23-24. After the heating of side 23-24, the cycle counter 252 energizes the relay R10 to open normally closed relay contact R10a to remove the potentiometer 165 from the circuit and to close normally open relay contact R10b to put potentiometer 166 in the circuit. The potentiometer 166 is set for heating the side 24-25 to a lower temperature during the last side welding cycle for the reasons discussed above. After the side 24-25 is heated, the cycle counter energizes relay R11 to open normally closed relay contact R11a to remove the potentiometer 166 and to close normally open relay contact R11b to put potentiometer 165 back in the circuit for the heating of short side 25-22.

As taught in U.S. Pat. No. 3,847,584, during the welding side cycle, it has been found to be unnecessary to heat each side on every side welding cycle of the welding operation. Accordingly, relay R43 is provided which when energized causes the side counter 254 to operate in such a manner that no current is passed through sides 23-24 or 25-22. As illustrated, toggle switches 258 and 260 may be provided to cause relay R43 to be energized during the first or second side heating cycle. The relay contacts R3b, R4a, and R9b are provided to enable one or both the toggle switches 258 and 260 to operate relay R43 during the first or second side heating cycles.

The discussion will now be directed to the operation of the contactors C1 through C6 during the diagonal welding cycles. At the end of the last side welding cycle, relay contacts R24a, R25b, R26a, R26c, R27b, R26d, and R27d are closed to energize contactors C3 and C4, and the relay contacts R24b, R25a, R26b, R26e, R27a and R27c are open to deenergize contactors C1, C2, C5 and C6.

After the heating of the side 25-22 for the last side heating cycle, relay R26 is energized to open normally closed relay contacts R26a, R26c and R26d to de-energize contactors C4 and C3 respectively and to close normally open relay contacts R26b and R26e to energize contactor C6 and C2 to close contacts C6a and C2a, respectively. Contact R26i also opens to keep relay R7 de-energized to insure that only long side voltage will be applied. Voltage is applied through contacts C6a and C2a to electrodes 17 and 19 to heat side 23-24-25 and 25-22-23, for the first half of the diagonal welding cycle. At the end of the first half of the diagonal welding cycle, the relay R27 is energized to open normally closed relays R27b and R27d to de-energize contactors C6 and C2 and to close normally open relay contacts R27a and R27c to energize contactor C5 and C4 to contacts C5a and C4a respectively, to heat the sides 24-25-22 and 24-23-22 to complete the second half of the diagonal welding cycle.

If during the automatic operation of the diagonal welding cycle the operator visually determines that the four marginal edges being simultaneously welded are not properly fusing together, he can push the side hold button 256 which permits an override of the stepping network by disabling current trip network 76. Depressing switch 256 energizes the relay R8 to open the relay R8a contact thereby preventing the current trip network 76 from detecting the current level in the welding transformer. When this occurs, the current continues to flow through all four marginal edges until the operator releases the push button 256 and contact R8a recloses to place the current trip network 76 back in the circuit. In this manner, the operator can increase the temperature of all four marginal edges.

On the other hand, if the operator visually determines during the automatic operation of the diagonal welding cycle that a weld is not acceptable in one of the four marginal edges, the circuit shown in FIG. 6B is employed.

In the way of illustrating the operation of the circuit of FIG. 6B it is assumed that the welder is on the first half of the fourth welding cycle, i.e., the second diagonal welding cycle, and, therefore, the off/on switch 262 and relay contacts R4c, R28a and R28b are closed to heat sides 23-22-25 and 23-24-25. From visual inspection, it is determined that side 22-23 of sheet 12 is not fusing properly to the lower sheet because side 22-23 is not sufficiently hot. The toggle switch 232 is moved to close contacts 234. Current flows from line 242 through the closed relay contact R4c, the closed switch 262, the closed relay contact R28b, and through the closed contacts 234 of the toggle switch 232 to energize relay R29 connected at one side to the line 244.

Energization of the relay R29 shifts closes its normally open relay contacts R29b, R29c, R29d and R29e and opens its normally closed relay contact R29a. The relay contact R26j is open when R26 is energized for the diagonal welding cycles. The first half cycle of diagonal welding continues until the current trip 76 senses that the proper current has been reached and turns off the welder to switch to the second half cycle of diagonal welding. When this occurs, the relay R28 de-energizes and its contact R28a shifs to de-energize the relay R26 because contacts R28a and R29a are now open.

The relay R29 remains energized through the relay contact R4c, the switch 262, relay contact R29b and the contact 234 of the switch 232. When the relay R26 de-enerigizes its relay contact R26j closes and the relay R30 is enerigized through now closed relay contacts R26j and R29e. At the same time, the relay R8 is energized through relay contacts R29d and R26f (FIG. 6A). The contacts of the relay R30 shift and clear the relays in the side counter 254.

When R26 is de-energized, it opens its closed relay contact R26e and closes its open relay contacts R26a, R26c and R26d. The contactor C2 is de-energized, the contactor C4 is energized and the contactor C6 remains energized.

The above occurs before dwell-timer TDI times out. When TDI times out, its contacts close to energize relay R31 to start the weld again. Long side welding voltage is applied to the electrodes 16 and 17 through contactors C6a and C4a to flow current through marginal edge portions 22-23. Current continues to flow because the current trip 76 has been disabled by energized relay R8 which opened its normally closed relay contact R8a (FIG. 4) to prevent current trip. When the operator determines that sufficient temperature has been added to side 22-23, the toggle switch 232 is released to open its contacts 234. The relay R29 is de-energized to de-energized relay R8 which reactivates the current trip 76 by closing the relay contacts R8a. When sufficient current flows to activate the current trip, relay R28 is de-energized because the welder is no longer firing. When this occurs, the relay R30 is de-energized by opening closed relay contact R28d. At the same time, the relay R26 energizes because relay contacts R28e, R29a, R32a, R34a, R36a close. The relay R30 de-energizing activates the side counter 254 putting it back on diagonal corners 23 and 25. When the relay R26 energizes, its contacts shift de-energizing the contactor C4 to open contact C4a and energizing the contactor C2 to close contact C2a because relays R24, R25 and R27 are de-energized by the side counter circuit 254. Dwell-timer TDI times out and contact TD1a closes energizing R31 to start the weld. Voltage is applied to diagonal corners 25 and 23 and current begins to flow in all four edges. The welder is back to normal automatic diagonal welding.

Assume now that the side 24-25 requires additional heat. The switch 232 is moved to close its contacts 236 to energize relay R32. The relays R32 and R33 then work together at the proper time to de-energize the relay R26 and energize the relay R8. The relay R33 clears the side counter 254 and also energizes the side counter relays R24 and R25 to close relay contacts R24b and R25b to energize contactors C1 and C3 to close contacts C1a and C3a, respectively. The welder passes voltage through electrodes 18 and 19 to heat the side 24-25 of the sheet. When the long side 24-25 of the sheet is heated to the desired temperature, the switch 232 is released to open the contact 236. The trip circuit 76 is reactivated by closing the relay contact R8a; and when sufficient current is reached, as determined by the current transformer 74, the welder turns off. The relay R33 is de-energized by opening relay contact R28d when the relay R28 is de-energized by the welder turning off. The relay contact R28e also closes energizing relay R26, and the welder is back on the first half of the diagonal welding cycle.

Assuming now that during the first half of the diagonal welding cycle, the operator determines that short side 23-24 is below the desired temperature. The switch 232 is operated to close the contacts 235 to energize the relay R34. The relay contacts R34a opens and relay contacts R34b-R34e close. The first half of the diagonal welding cycle continues until the current trip 76 indicates the sides are heated to the desired temperature and turns the welder off to switch to the second half of the diagonal welding cycle. When this occurs, the relay R28 de-energizes to shift its contact R28a de-energize the relay R26 because contact R34a is open. The relay R34 remains energized through the relay contact R4c, the switch 262, relay contact R34b and the contact 235 of the switch 232. When the relay R26 de-enerizes its relay contact, R26j closes and the relay R35 is energized through now closed relay contact R34e. The relay R35 is energized and switches its contacts R35a and R35b. Closing the relay contact R35b energizes the relay R7 to switch its contacts and put the short side power regulator 44 in the system. The contacts of the relay R35 also clear the relays in the side counter 254.

When the relay R26 is de-energized, it opens its closed relay contacts R26e and closes its open relay contacts R26a, R26c and R26d. The contactor C2 is de-energized and contactor C6 remains energized while the contactor C1 is energized by the energization of relay R24. The contactor C1 closes contact C1a and voltage is applied to the side 23-24 through electrodes 17 and 18.

When the side 23-24 is at the desired temperature, the switch 232 is released to open its contacts 236 to de-energize the relay R32 which de-energizes relay R8. When current trip occurs, R28e closes to energize relay R26 because contact R32a is already closed. The welder is now back to diagonal welding.

The relays R36 and R37 for heating the short side 25-22 operate in a similar manner as the relays R34 and R35 for heating the short side 24-23 except that contactor C4 and C3 are energized to close contacts C4a and C3a. In this manner, voltage is applied through electrodes 16 and 19 to heat the short side 22-25.

The voltage detector 192, which forms a part of the current trip network 76, incorporates a flip-flop circuit (not shown) which is responsive to a current tripping signal to shift momentarily from a steady state condition to an unstable condition at which time it produces a signal which operates the relays of the side counter 254 to shift the welding current from one marginal portion of the glass to the next during the side heating welding cycles and to shift from one pair of diagonal corners to the next for the diagonal heating cycles. During the steady state of the voltage detector flip-flop, a relay R38 is energized. Its contacts R38a close and the relay R28 is energized. When a current trip condition occurs, R38 is de-energized and R38a is open momentarily to deenergize the relay R28. The relay contacts R38b in series with the dwell-time delay TDI are momentarily closed and with relay R2 energized during normal operation and contacts R2b consequently closed. TDI is energized to initiate dwell-timing sequence to insure delay between the current trip condition and the start of the next cycle. At the end of the preset delay, relay TDI times out and its corresponding contact TD1a closes to energize relay R31 which is the weld starting relay. Energization of the relay R31 allows the flip-flop in the voltage detector to return to its stable condition, whereby R38 returns to its energized condition, thereby energizing the relay R28 and initiate heating of the adjacent side for the side welding cycles and shifting to diagonal corners for the diagonal welding cycles.

The relay R7 which controls the firing of the short side ignitron power regulator during the side heating cycles by shifting relay contacts R7a through R7f (FIG. 3) is connected in series with the normally closed relay R43a contact, the normally open contact R39a, and the normally closed relay contact R26i. The relay contact R43a is open only during the side heating cycles when the relay R43 is energized to indicate that the ends of the glass are to be skipped during the side welding cycle in which case the short side power regulator is not required. When the ends are to be heated at the normal heating cycle, side counter relay R39 will be energized at the appropriate time to close contacts R38a and shift the relay contacts of the relay R7 so that the power regulator 44 is placed in circuit with the autotransformer 50 in place of the long side power regulator 42 during the side welding cycles. When the diagonal welding cycles begin, R26 is energized shifting contact R26i to its open position. This disables the short side firing network so that only long side voltage can be applied. The sequencing relays for the automatic phase sequencer 96 (FIG. 5) are diagrammed in FIG. 7C where the main switch SS1 is provided in the power line 242 to permit the automatic sequencer to be removed from the circuit if desired. When the switch SS1 is open, the relay network of FIG. 7C is removed from the phase shift control system and phase control of the power regulator reverts to a manual control by the operator potentiometer 226 (FIG. 5) through the normally closed contacts R14b. The relay R14 is shown in FIG. 6C as being connected across power lines 242-244 by way of normally closed switch SS2 or the normally closed relay contact R9c which is connected in parallel with switch SS2.

It will be recalled that relays R3-R6, R9, R12, R13 and R20-R23 are the cycle counter relays 252 which are energized during the corresponding cycles. Thus, during the first side heating cycle, the relay R9 is not energized and, therefore, contact R9c remains closed; however, on the second cycle of operation, the relay R9 is energized to open the relay contact R9c and thereby open one of the energization paths to relay R14. The switch SS2 is a cycle skip switch and when open causes the relay R14 to be de-energized on the second side heating cycle, thus placing control of the heating current cycle 2 on the operator potentiometer 226 (FIG. 6). Since in the present embodiment, the automatic phase shift sequencer is to be operative only during the first two side heating cycles, the relay contact R4e is connected in series between the parallel arrangement of switch SS2 and contactor, the relay contact R9c and the remainder of the relay network, so that at the start of the third cycle or first diagonal welding cycle and the consequent energization of the relay R4, the relay network is disabled.

During the side heating cycles with either/or both of switches SS2 and the relay contact R9c closed, power is applied through normally closed relay contact R4e to power line 264 to energize selective ones of relays R40, R41 and R42. These relays are energized when heating currents are applied to the short sides of the glass sheet during cycle 1, the long sides during cycle 2 or the short sides during cycle 2, respectively, to modify the operation of the remainder of the relay network as will be described. The cycle 1 short side relay R40 is connected between lines 264 and 244 by normally closed relay contact R9d and normally open relay contact R7g. Since the relay contact R7g is a short side relay and is energized only when the short side of the glass is to be heated and since the relay R9 is energized during the second cycle, it will be apparent that the relay R40 can be energized during cycle 1 only and only when the short sides of the glass are being heated. Similarly, the cycle 2 long side relay R41 is connected to the line 264 by way of normally closed relay contact R7h and normally open cycle relay contact R9e, and the cycle 2. Short side relay R40 is connected to the line 264 through normally open relay contact R7i and normally open relay contact R9e. Accordingly, the relays R41 and R42 can be energized only during the second cycle with the particular relay energized being dependent upon whether the short side relay R7 is energized.

The actual firing of the power regulators 42 and 44 is controlled by the relay R28 which is energized only when the voltage detector relay R38 (FIG. 4) is energized to indicate that the system is ready for the welding operation. The relay R28 is thus de-energized and re-energized between each heating step, with the dwell-time delay timer TDI regulating through the relays R31 and R38, the off time between successive applications of power, or duty cycles, of the power regulator. Energization of the relay R28, therefore, indicates the welding system is ready for the next sequencing operation of the automatic phase sequence 96. Accordingly, the relay contact R28a is closed to connect power from the line 264 to line 266.

At the start of the heating operation with main switches SS1 closed and firing relay R28 energized, power is applied to the relay R14 to close its contacts R14a (FIG. 5) and to place potentiometer 222 across lines 228 and 230 of the phase shift controller 46 (FIG. 2) whereby the setting of the potentiometer 222 regulates the firing angle of the power regulator 42 to control the effective current along the side 22-23 of the glass sheet. At the same time, timer TD2 (FIG. 7C) is energized to control the length of time the potentiometer 222 remains in the circuit. When timer TD2 times out, its contact TD2a closes to connect timer TD3 across the lines 266 and 244 for energization and further energizes the relay R15. This opens the relay contact R15a (FIG. 5) and closes contacts R15b thereby replacing the potentiometer 222 with the potentiometer 223 to thereby adjust the firing angle of the power regulator 42 in accordance with the setting of the potentiometer 223. This potentiometer remains in the control circuit until timer TD3 times out, causing contact TD3a to close and energize timer TD4 and the relay R16 opening contact R16a (FIG. 5) to remove potentiometer 223 from the control circuit and closing the relay contact R16b to connect potentiometer 224 across the lines 228 and 230. The relay R16 also closes its contact R16c to maintain the energization of the relay R15 to hold potentiometer 22 out of the control circuit.

When the timer TD4 times out, its contact TD4a is closed to energize the relay R17 and start timer TD5. The energization of the relay R17 opens its contact R17a to remove the potentiometer 224 from the circuit, closes its contact R17b so that the potentiometer 225 is placed in control of the firing angle of the power regulator 42 and closes contact R17c to hold the relay R16 in its energized state and prevent the potentiometers 222 and 223 from affecting the power regulator 42. When TD5 times out, it closes its contact TD5a to energize the relay R18 which shifts its contacts to open the relay contact R18a and remove the potentiometer 225 from the control circuit replacing it with manually controlled operator's potentiometer 226 by way of the relay contact R18b. Again the relay contact R18c holds the relay R17 to prevent the potentiometers 222, 223 or 224 from affecting the control circuit. The operator's potentiometer remains in control of the power regulator 42 until the current level through side 22-23 reaches the trip level at which time the current trip current 76 produces a signal that the voltage detector 192 which de-energizes the relay R38 opening its relay contact R38a and de-energizing R28 thereby removing power from the line 266 and resetting the relay system of FIG. 7C. The side counter relays generally indicated in FIG. 7A are then operated to shift the system to side 23-24 of the glass sheet.

Since side 23-24 is a short side, the relay R7 is now energized to disconnect long side power regulator 42 and connect short side power regulator 44 into the welding system. At the same time, the relay contact R7g (FIG. 6C) is closed to energize the relay R40. At the end of the dwell time set by timer TD1, the relay R28 is re-energized and the second step of the first heating cycle commences. Again, the relay R14 and time delay TD2 are energized; but since the relay R40 is also energized, the normally open contacts R40a are closed to bypass contact TD2a. Accordingly relay R15 and timer TD3 are immediately energized, without waiting for TD2 to time out, placing potentiometer 223 in the control circuit. The energization of the relay R40 also closes contact R40b which is in series with a selector switch SS3. This switch, when closed, energizes the relay R16 and time delay TD4 to bypass the relay R15 and timer delay TD3, thereby permitting the short side to be initially heated under the control of potentiometer 224. Similarly, a switch SS4 in series with the relay contact R40c is provided to permit the short side heating sequence to start on the potentiometer 225 by initially energizing the relay R17, and time TD5. Accordingly, on the short side heating steps of cycle 1, the potentiometer 22 is skipped; and if switches SS3 and SS4 are closed, potentiometers 223 and 224 may also be skipped.

On the cycle 1, short side step, the selcted timer TD3, TD4, or TD5 times out and shifts the control to the next higher potentiometer, and its corresponding timer in the manner described above, with this sequence continuing as before until a current trip signal is produced at the voltage detector 192 (FIG. 4). When trip occurs, the counter relays shift to the third step, which is the side 24-25 of the glass, and the relay R28 is de-energized to reset the sequencing relays of FIG. 6C. Short side relay R7 is de-energized; and after time delay timer TD1 has timed out, the potentiometers 222 and 226 are sequenced as described with respect to the side 22-23 to vary the firing angle of the long side power regulator 42 in accordance with the settings of these potentiometers, producing the desired heating curve in side 24-25. When current trip occurs, the system is reset and again the side counter relays energize the R7 relay to repeat the short side sequence for the side 25-22. The current trip which occurs at the end of the fourth heating step, at side 25-22 of the glass, completes the first cycle and the stepping of the relays of the side counter 254 then operates the cycle counter 252 to energize the relay coil R9 and set the system up for the second automatic side welding cycle.

Energization of the relay R9 opens contact R9c and R9d while closing the relay contact R9e, thereby removing the relay R40 from the control circuit and permitting energization of either relay R41 and R42. Since the relays of the side counter relays 254 have now stepped back to the first side, which is the long side 22-23, the relay R41 is energized. Upon closure of the relay contact R28a, the second heating cycle begins. As before, the relay R14 and timer TD2 are energized; but because of the energization of cycle relay R9, contact R9b is now closed to energize the timer TD4 and the relay R16, thus placing the potentiometer 224 in the control circuit. The energization of R16 removes the potentiometer 223 from the circuit, while the relay contact R16c energizes the relay R15 to remove the potentiometer 222 from the control circuit. Thus, the second cycle automatically starts under the control of the potentiometer 224, producing a higher effective initial current to the glass.

Although the timers TD2 and then TD3 continue to operate in the previously discussed way, the energization of the relays R15 and R16 prevent them from having any effect on the control circuit. When the timer TD4 times out, however, the relay R17 and timer TD5 are energized to sequence the control to the potentiometer 225 and when TD5 times out control is shifted to potentiometer 226 until current trip occurs. It will be noted that because the relay R41 is energized during the long side heating step in cycle 2, the relay contact R41b is closed, so that selector switch SS5 can be closed to directly energize the relay R17 and timer TD5, whereby the second cycle long side heating can be started on the potentiometer 226, if desired.

When the tripping current is attained in side 22-23, cycle 2, the system is stepped to the short side 23-24 to energize the relay R42. Upon closure of the relay contact R28a, the now-closed contacts R9b serve to energize the timer TD4 and relays R34 and R33 as before, but because the relay R42 is energized on the short side heating step of cycle 2, the relay contact R42a allows a selector switch SS6 to be used to immediately energize the timer TD5 and the relay R17, if so desired, so as to start the control on the potentiometer 225. When this is done, it will be noted that the relay R17 opens its contacts R17a to permit energization of the relay R16 which, in turn, closes its contact R16c to energize the relay R15, thereby removing the potentiometers 222 and 223 from the control circuit. Similarly, if desired, a switch SS7 is provided in series with a contact R42b whereby the short side step of the second cycle can be started on the potentiometer 226 by directly energized relay R18, the energization of this relay serving to hold the potentiometers 222 through 225 out of the control circuit by way of contacts R18c, R17c, and R16c. Again, the occurrence of a predetermined maximum current for this step of the second cycle will produce a current trip which will reset the relays of FIG. 6C and advance the side counter relays to the long side 24-25.

The heating of long side 24-25 during the second or last side heating cycle is similar to the heating of the long side 22-23 with the following exception. At the end of the heating of short side 23-24 and before the heating of long side 24-25, the relay R10 in the side counter 254 is energized to open normally closed relay contact R10a and close normally open relay contact R10b (FIG. 4) to remove the potentiometer 165 and replace it with the potentiometer 166. The potentiometer 166 is at a lower setting in order that the long side 24-25 is cooler than during the first side welding cycle in preparation for the subsequent diagonal welding cycle. The advantage of heating the long side 24-25 to a lower temperature than during the first side welding cycle was discussed above.

After the heating of the long side 24-25 and before the heating of the short side 25-22, the relay R11 in the side counter 254 is energized to open normally closed relay contact R11a and close normally open relay contact R11b. The potentiometer 166 is removed from the circuit and the potentiometer 165 put back in for the heating of short side 25-22.

The heating of short side 25-22 proceeds in accordance with the option selected for side 24-23 and upon occurrence of the current trip, the side counter relays are shifted and the cycle counter 252 shifts to the first diagonal welding cycle. When this occurs, the relay contact R4e is open and the circuitry of FIG. 6c is removed from the control system so that the relays and contacts in the automatic sequencer are made inoperable.

As illustrated in FIG. 2, when the relay R4 is energized at the start of the first diagonal welding cycle and the automatic phase sequencer 96 no longer controls the phase angle of the power regulators 42 and 44. The potentiometer 93 of the controller 46 controls the phase angle of the long side power regulator for the first diagonal welding cycle, the potentiometer 94 controls the phase angle for the second and third diagonal welding cycle; the potentiometer 95 controls the phase angle for the fourth and fifth diagonal welding cycle.

To start the first diagonal welding cycle, the relay R26 is energized to close its normally open relay contacts R26b and R26e to energize contactors C6 and C2, respectively. The contactors C6 and C2 close their contacts C6a and C2a to apply voltage to electrodes 17 and 19, respectively, to heat sides 25-24-23 and 25-22-23 of the sheet. When the sides are heated to the desired temperature, as indicated by the current trip, the relay R27 is energized to close normally open contacts R27a and R27c, and open contacts R27b and R27d. The contactors C4 and C5 are energized to close their contacts C4a and C5a. Voltage is applied to the electrodes 18 and 16 to heat the sides 22-23-24 and 24-25-22 of the sheet.

The above is repeated for the second diagonal welding cycle. At the end of the second diagonal welding cycle, the relay R5 is energized. The energization of the relay R5 opens normally closed relay contacts R5a to remove the potentiometer 93 from the controller 46 and closes normally open relay contact R5b to put the potentiometer 94 in the controller circuit. The third welding cycle proceeds in a similar manner as the first diagonal welding cycle.

After the third diagonal welding cycle, the relay R6 in the cycle counter is energized to close normally open relay contact R6b and open normally closed relay contact R6a. The potentiometer 94 is removed and the potentiometer 95 is put into the controller circuit 46. The fourth and fifth diagonal welding cycle proceeds in a manner similar to the first diagonal welding cycle.

After the fifth diagonal welding cycle, the edges of the glass sheets are fused to form a glass edge multiple glazed unit.

To accommodate various sides of window unit and to permit compensation for various characteristics of glass being used, the system is provided with a number of variables which permit selection of the exact heating current required for the particular glass and marginal edge being heated, during the side welding cycles and during the diagonal welding cycles. Thus, the long sides of glass may be used in accordance with the different pattern than the short sides and in some circumstances it may be found that selective cycles of heating may be completely skipped. In addition to various switches which allow selection for elimination of potentiometers and timers which regulate the operation of the system, the potentiometer and timers themselves are adjusted to allow a considerable variation of the amount of current applied at any given instrument in the heating sequence and to regulate the length of time during which the current level is applied.

Although the invention has been described in terms of the preferred embodiment thereof, it will be apparent to those of ordinary skill in the art that numerous modifications and varations may be made without departing from the true spirit of the scope thereof as set forth in the following claims.

What is claimed is:

1. In a method of heating marginal edge portions of a glass sheet having corners to a fusing temperature, wherein the method includes the step of applying a conductive stripe to marginal edge portions of the sheet; sequentially applying a voltage to adjacent pair of sheet corners to pass an electrical potential along the conductive stripe between the adjacent sheet corners; practicing the sequentially applying step for a predetermined number of heating cycles to heat the marginal edge portions to a temperature sufficient to pass current therethrough; and alternately applying an electrical potential to diagonally opposed corners of the sheet, wherein marginal edge portions on one side of diagonally opposed corners is a first current path and marginal edge portions on the other side of the diagonally opposed corners is a second current path, the improvement comprising:
adjusting the heat input into one or more of said marginal edge portions in one of said current paths during the last heating cycle until the difference in resistance between said first and second current paths is substantially reduced.

2. In a method of fusing sheets together to form multiple glazed units, the glass sheets having corners wherein the method includes the steps of applying a conductive stripe to marginal edge portions of at least one sheet; mounting a first sheet over a second sheet; sequentially applying a voltage to adjacent pair of sheet corners to pass a current along the conductive stripe; practicing the sequentially applying step for a predetermined number of heating cycles to heat the marginal edge portions to a temperature sufficient to pass current therethrough; alternately applying an electrical potential to diagonally opposed corners of the sheet, wherein marginal edge portions on one side of diagonally opposed corners is a first current path and marginal edge portions on the other side of the diagonally opposed corners is a second current path; practicing the alternately applying step to heat the marginal edge portions of the sheets to a welding temperature; and welding marginal edge portions of the sheet together to form the multiple glazed unit, the improvement comprising:
adjusting the heat input into one or more of said marginal edge portions in one of said current paths during the last heating cycle until the difference in resistance between first and second current paths is substantially reduced.

3. The method as set forth in claim 1 wherein said selectively heating step includes the step of:
heating a selected one of the marginal edge portions of the sheet during last heating cycle to a predetermined temperature lower than the temperature at which a selected previously heated marginal edge portion of the sheet was heated during the last heating cycle.

4. The method as set forth in claim 2 wherein said selectively heating step includes the step of:
heating a selected one of the marginal edge portions of the sheet during last heating cycle to a predetermined temperature lower than the temperature at which a selected previously heated marginal edge portion of the sheet was heated.

5. The method as set forth in claim 4 wherein said heating step is practiced by imposing a first voltage on the selected one of the marginal edge portions and a second voltage on the selected previously heated marginal edge portions of the sheet wherein the first voltage is less than the second voltage.

6. The method as set forth in claim 4 wherein said heating step during the last heating cycle includes the steps of:
imposing a voltage of a predetermined value on a first marginal edge portion of the sheet;
imposing a voltage of a predetermined value on a second marginal edge portion of the sheet adjacent the first marginal edge portion;
imposing a voltage of a value less than the voltage value applied to the first marginal edge portion on a third marginal edge portion of the sheet adjacent the second marginal edge portion; and imposing a voltage of a predetermined value on a fourth marginal edge portion of the sheet.

7. The method as set forth in claim 4 wherein said heating step is practiced by applying an electrical potential to the selected one of the marginal edge portions for a shorter time period than the time period at which an electrical potential was applied to the selected previously heated marginal edge portion.

8. The method as set forth in claim 4 wherein said heating step during the last heating cycle includes the steps of:
   imposing a voltage of a predetermined value on a first marginal edge portion of the sheet for a first predetermined time period;
   imposing a voltage of a predetermined value on a second marginal edge portion of the sheet adjacent the first marginal edge portion for a second predetermined time period;
   imposing a voltage of a predetermined value on a third marginal edge portion of the sheet adjacent the second marginal edge portion for a third predetermined time period of a duration less than the first predetermined time period; and
   imposing a voltage of a predetermined value on a fourth marginal edge of the sheet for a fourth predetermined time period.

9. The method as set forth in claim 8 further including the step of providing a sheet having the length of the first and third marginal edge portions greater than the length of the second and fourth marginal edge portions.

10. The method as set forth in claim 8 wherein the alternately applying step is practiced by imposing a voltage between (1) the first and second marginal edge portions and (2) the third and fourth marginal edge portions followed by imposing a voltage between (1) the second and third marginal edge portions and (2) first and fourth marginal edge portions.

* * * * *